United States Patent [19]
Potvin

[11] 3,852,569
[45] Dec. 3, 1974

[54] ELECTRIC GRILL

[75] Inventor: Alfred M. Potvin, Beauceville, Quebec, Canada

[73] Assignee: Heetco Ltee., Quebec, Canada

[22] Filed: Dec. 26, 1972

[21] Appl. No.: 318,558

[52] U.S. Cl. .................. 219/525, 99/376, 99/378, 219/461
[51] Int. Cl. ........................................... H05b 3/06
[58] Field of Search .......... 219/460, 461, 524, 525; 99/331, 372, 376, 378, 380, 381

[56] References Cited
UNITED STATES PATENTS

| | | | |
|---|---|---|---|
| 1,742,945 | 1/1930 | Banft | 99/376 X |
| 1,866,874 | 7/1932 | Barnes et al. | 99/378 X |
| 2,044,615 | 6/1936 | Kennedy | 99/376 X |
| 2,105,814 | 1/1938 | Lent | 219/525 X |
| 2,632,380 | 3/1953 | Knapp | 99/376 |
| 2,644,880 | 7/1953 | Valentini et al. | 219/525 |
| 2,710,906 | 6/1955 | Lipsich et al. | 219/525 X |
| 3,095,498 | 6/1963 | Foster | 219/441 |
| 3,172,999 | 3/1965 | Sutton et al. | 219/524 |
| 3,245,337 | 4/1966 | White et al. | 99/331 |
| 3,696,734 | 10/1972 | Beasley et al. | 99/331 |

FOREIGN PATENTS OR APPLICATIONS

| | | | |
|---|---|---|---|
| 276,365 | 11/1928 | Great Britain | 219/525 |
| 511,872 | 10/1920 | France | 219/460 |
| 809,858 | 3/1959 | Great Britain | 219/525 |
| 838,650 | 6/1960 | Great Britain | 219/525 |

*Primary Examiner*—Volodymyr Y. Mayewsky

[57] ABSTRACT

An electric grill comprising a lower and an upper grill chassis each of which has a bottom wall, sidewalls about the bottom wall and a grill plate defining an upper wall. The grill plates are each removably secured to a respective grill chassis. A resistive heating element is secured intermediate the bottom wall and the grill plate of each chassis and is supported in close proximity to the grill plate. Further wall means are provided between the heating element and the bottom wall. Support means are provided to support each of the chassis bottom walls about a common horizontal plane. The lower and upper chassis are interconnected by hinge means along one of their sidewalls to permit the upper chassis to be displaced through a 180° arc from a position where both grill plates lie side-by-side in a common horizontal plane to a further position where both grill plates face each other in substantially juxtaposition.

2 Claims, 7 Drawing Figures

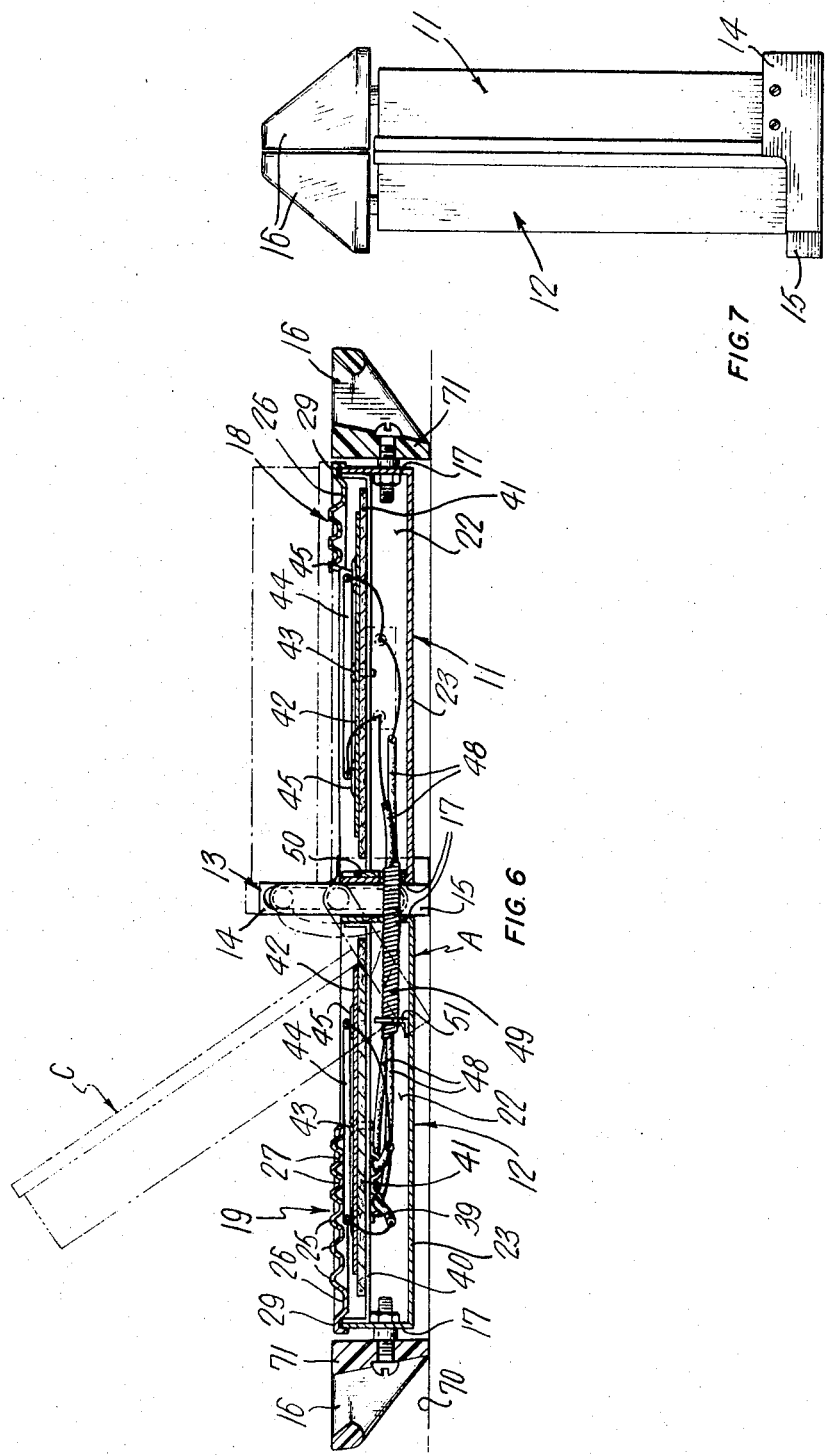

ELECTRIC GRILL

BACKGROUND OF THE INVENTION

*a.* Field of the Invention

The present invention relates to an electrical household appliance and more particularly to an improved electric grill having two grilling surfaces.

*b.* Description of Prior Art

Electric grill appliances heretofore known have been provided primarily for the grilling of small food portions and normally consist of a heated base and cover plate between which a small food portion for example, frankfurters, is broiled. These surfaces heat very slowly and become stained by the food and it is very difficult to clean them as they are not easily removable from their casing. In the majority of cases, these plates are permanently secured to the casing. Further, these appliances are not easily manipulable when hot and require excessive space for storage. Still further, the upper grill surface is specifically adapted to hinge over a lower plate and in the majority of known appliances, it cannot be hinged to lie in the same plane as the lower grill surface to provide two independent broiling surfaces. Furthermore, the casings for these type appliances become excessively hot because the heating elements are completely encased in an air tight metallic housing.

SUMMARY OF THE INVENTION

It is an aim of the present invention to provide an improved electric grill appliance which can be easily dismantled for cleaning.

It is a further aim to provide an electric grill which can be easily manipulated whilst in use or for storage.

It is a still further aim to provide an electric grill having improved heating surfaces and which will permit the grilling of larger food portions than heretofore possible and cook the food more rapidly.

According to the above aims, from a broad aspect the present invention provides an electric grill comprising a lower and an upper grill chassis each of which has a bottom wall, sidewalls about the bottom wall and a grill plate defining an upper wall. The grill plates are each removably secured to a respective grill chassis. A resistive heating element is secured intermediate the bottom wall and the grill plate of each chassis and is supported in close proximity to the grill plate. Further wall means are provided between the heating element and the bottom wall. Support means are provided to support each of the chassis bottom walls above a common horizontal plane. The lower and upper chassis are interconnected by hinge means along one of their sidewalls to permit the upper chassis to be displaced through a 180° arc from a position where both grill plates lie side-by-side in a common horizontal plane to a further position where both grill plates face each other in substantially juxtaposition.

BRIEF DESCRIPTION OF DRAWINGS

A preferred embodiment of the present invention will now be described with reference to the accompanying drawings in which:

FIG. 6 is a sectional fragmented view, partly in phantom lines and illustrating the various positions of the upper grill plate; and FIG. 7 is an end view showing the grill in a stored vertical position.

DESCRIPTION OF PREFERRED EMBODIMENTS

Figure 1:
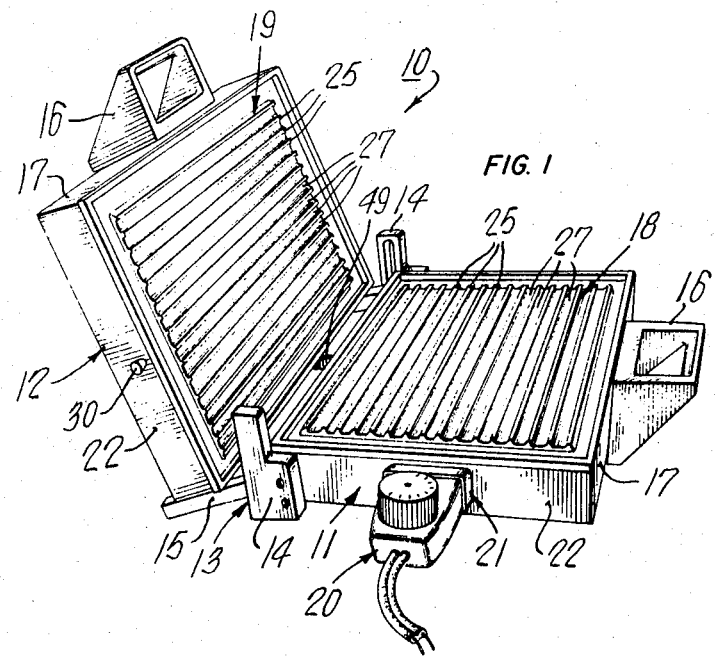
FIG. 1 is a perspective view of the grill appliance.

Referring now to the drawings and more particularly to FIG. 1, there is designated generally by the numeral 10 the improved electric grill appliance of the present invention. The grill 10 comprises a lower grill chassis 11 and an upper grill chassis 12, both of which are of substantially rectangular configuration. The upper grill chassis 12 is connected to the lower grill chassis 11 by a hinge 13 whereby the chassis 12 can be juxtaposed over the chassis 11 and further provide other important functions as will be described later. The hinge 13 is made of two sections or members, a channel member 14 and a channel connector member 15, both of which can be connected together without the use of tools, and by simply displacing the upper grill chassis 12 angularly from the horizontal plane of the bottom chassis 11. The hinge members 14 and 15 are secured adjacent the edge of a longitudinal sidewall of their respective chassis and a handle member 16 is secured centrally on the opposite sidewall 17. A lower grill plate 18 and an upper grill plate 19 is secured respectively to the lower chassis 11 and upper chassis 12 whereby these grill plates will face each other when said chassis are in juxtaposition. Electrical power is supplied to the grill plates 18 and 19 by a thermostatic control plug 20 connected to an electrical receptacle 21 secured to an end wall 22 of the lower chassis 11.

Figure 4:
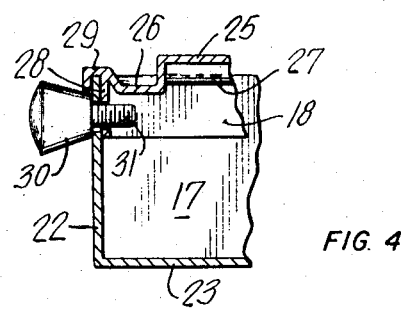
FIG. 4 is a sectional view illustrating the securement of the grill plates.

Referring now additionally to the remaining figures, it can be seen that the upper and lower grill plates 18 and 19 each have an undulated surface defining elongated ridges 25 extending in parallel relationship in a rectangular area slightly smaller than the total area of the plate. A continuous channel 26 is provided about the rectangular area containing the ridges 25 with its bottom surface being lower than the troughs 27 formed between adjacent ridges 25 whereby excess fluids present during the grilling of food will flow in the troughs 27 and collect in the channel 26. The peripheral vertical walls 28 of each plate extends below the undulated surface and fits in close contact inside the side and end wall of each chassis. A peripheral flange 29 extends outwardly and downwardly of the walls 28 to receive the upper edge of the side and end walls in a groove formed thereby. A plate securing knob 30 having a threaded shank 31 extends through a hole 24 in the chassis end walls 22 and secured in an aligned threaded bore provided in the end peripheral walls 28 of the plates (see FIG. 4).

The grill plates 18 and 19 are formed of aluminum and their outer surfaces are coated with a tetrafluoroethylene resin commonly identified by the trademark "TEFLON" for easy cleaning and grilling.

Figure 3:
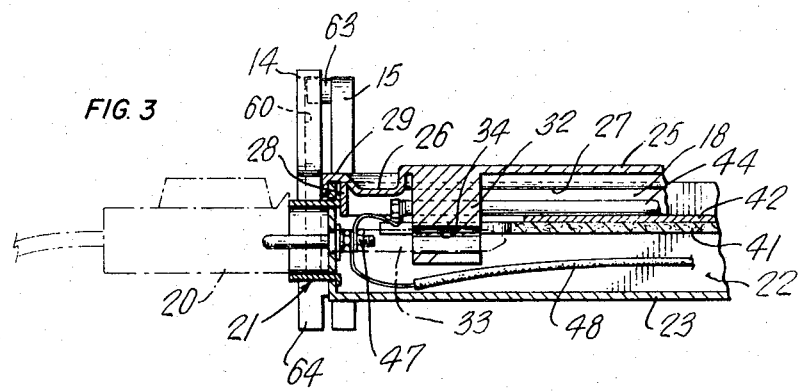
FIG. 3 is a sectional view of a portion of the lower grill chassis.

As shown in FIG. 3 the lower grill plate 18 is provided with an extension 32 formed integral with the lower plate 18 and extending above the inner surface thereof and located adjacent the electrical receptacle 21 whereby a tubular heat sensing element 33, on the plug 20, will extend in a through-bore 34 formed in the section 32 whereby the element 33 will sense the temperature of the lower plate 18 to thereby control electrical current applied to the heating elements associated with the plates 18 and 19.

Figure 2:
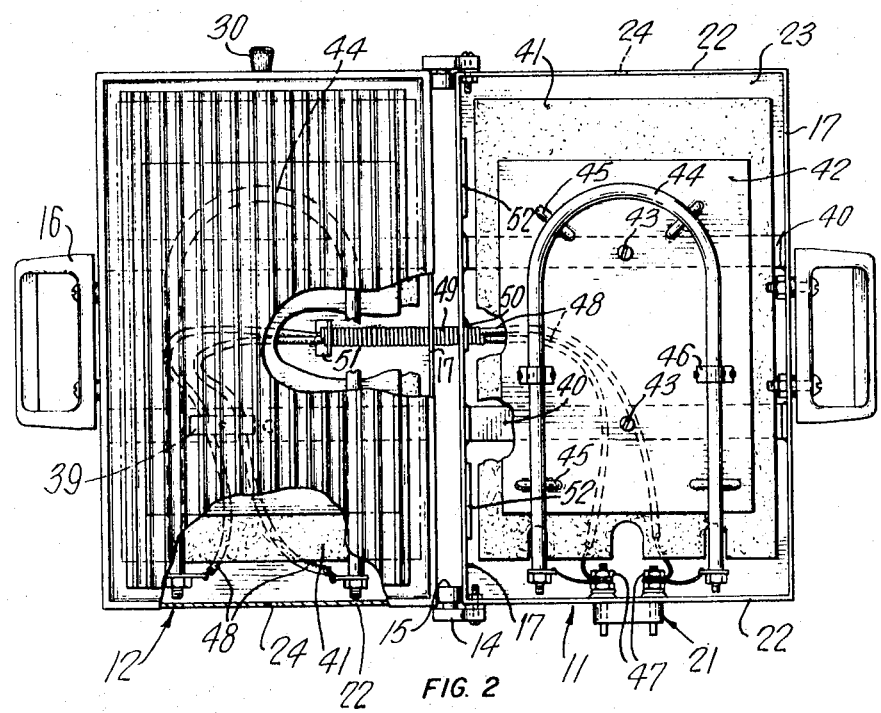
FIG. 2 is a top fragmented view of the grill in its fully open position.

Referring particularly to FIG. 2, both chassis 11 and 12 have opposed longitudinal sidewalls 17, end walls 22 and a bottom wall 23. Two transverse supports 40 are secured between the sidewalls 17 above the bottom wall 23 and substantially at mid height of the sidewalls 17. A heat insulating sheet 41, herein formed of asbestos, is positioned over the supports 40 and a metallic reflector plate 42 is positioned thereover. Screws 43 secure both the sheet 41 and the plate 42 to the supports 40. A resistive heating element 44, of substantially U-shape configuration is secured over the reflector plate 42 on elevated ridges 45 formed in the plate and retained by clamps 46 secured to the plate 42. The elements 44 are rated at 34 watts/in$^2$ and operate on 120 volts ac. When the plates 18 and 19 are secured to their respective chassis 11 and 12, the heating elements 44 associated with each chassis is in close proximity to the inner surface of the plates whereby it will transfer heat to the plates 18 and 19. Heat will also be reflected to the inner surface of the plates by the reflectors 42.

As can be seen from FIG. 2 the two U-shaped heating elements 44 are connected in parallel with the input electrical terminals 47 of connector 21. To connect the end of the heating element 44 located in the upper chassis 12, it is necessary for the two wires 48 to traverse both chassis 11 and 12. With the arrangement shown, the wires 48 cross the chassis through their rear sidewalls 17, intermediate the hinges 13, whilst permitting the upper chassis 12 to be tilted within a 180° arc without interference from the cable traversing both chassis sidewalls. This is achieved by locating the wires 48 in a hollow member i.e., spring 49, which is secured adjacent one of its ends to the sidewall 17 of the lower chassis 11 by suitable securing means such as the spring leaf 50. The spring 49 traverses both sidewalls 17 and extends a sufficient distance within the upper chassis 12 whereby a portion thereof is always within chassis 12. Adjacent the free end of the spring 49 there is secured a metal clip 51 to ensure that the spring never extends out of the sidewall of the upper chassis 12. Thus, as the upper chassis 12 is moved through an 180° arc, the spring 49 and wires 48 move in and out of the upper chassis through a hole and without interference. The wires are secured to a support 40 by a clamp 39 to maintain the connected end of the wires 48 stationary to prevent breakage of the wires at their terminal connection with the element 44.

As can further be seen from FIG. 2, ventilating slots 52 are located in the rear sidewall 17 of both chassis 52 whereby to vent the interior area of both chassis below the insulating plate 41 to prevent excessive heat transfer through the bottom wall 23 of both chassis.

Figure 5:
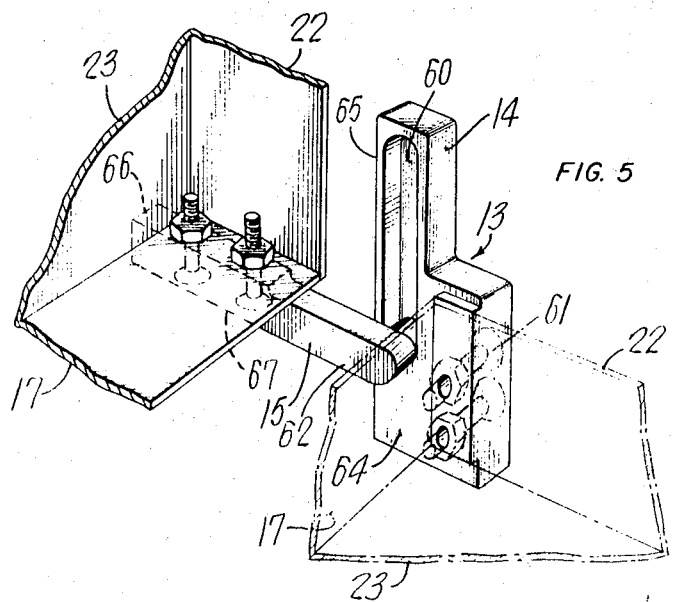
FIG. 5 is a perspective fragmented view of the hinge construction and securement.

Referring now more particularly to FIGS. 5 and 6 there is illustrated the construction of the hinge 13 which may be fabricated of suitable plastics or metals. As shown, the channel member 14 is secured to the end wall 22, adjacent the end edge of the wall, by suitable means such as screws 61. A small portion of member 14 extends beyond the bottom wall 23 and constitutes a leg 64 to support the chassis 11 above a support surface 70. An elongated guide channel 60 is formed within the member 14 and extends vertically relative to the horizontal plane of the chassis 11 and faces inwardly of the chassis 11. The member 14 further defines a flat vertical longitudinal edge 65 to provide a leg support to maintain the grill 10 in a closed vertical position as shown in FIG. 7.

The connector member 15 is formed by an elongated arm 62 secured adjacent the end edge of sidewall 17 of the upper chassis 12 and extends vertically above the grill plate 19 to define a connecting end where there is provided a pin 63, of circular cross-section, and extending at right angles to the arm 62 and outwardly to the end walls of the chassis 12. The other end of the arm 62, opposite the connecting end, extends beyond the bottom wall 23 to define a leg 66 to support the wall 23 above the support surface 70 when the chassis 12 is fully open as at A in FIG. 6. Also, a portion of the handle 16 extends above this bottom wall and constitutes a still further leg 71 for the longitudinal sidewalls 17 opposite the interconnected one. The outside longitudinal edge 67 of the arm 62 is flat and in conjunction with the edge 65 provides the proper support to support the grill 10 on its edge, as shown in FIG. 7.

To connect the hinge members 14 and 15 together the pin 63 of members 15 are inserted in a respective guide channel 60 of the members 14 in a manner hereinabove described. The end walls 64 of each channel 60 are arcuate to permit the pins 63 to rest and rotate there against when the upper chassis 12 is moved from its fully open position A to its closed position B (see FIG. 6). The chassis 12 may also be maintained in an open rest position C with the connector member 15 extending angularly from surface 70, as shown. The available spacing between the juxtaposed plates 18 and 19 when the chassis are in position B is governed by the length of the channel 60 extending above the plate 18 and the length of the connector 15 extending above plate 19. In this particular embodiment the plates may be spaced apart to a distance of approximately 2 ½ inches to receive pieces of food of at least that thickness whilst the plates are maintained substantially parallel to each other with the food there between.

As can be seen from the construction herein described there is provided an electric grill having grill plates which will more readily grill a food portion positioned therebetween because of its undulated surface and the internal construction of the chassis. Also, the plates can be very easily cleaned by simply removing them and immersing them into water. Still further, the channel 26 may have a bottom surface which slopes downwardly towards the front sidewall of the chassis whereby fluids will collect in the front portion of the channel which will be larger and provide easier removal of the fluids. Further, to remove the bottom plate 18 it is essential that the electrical power plug 20 be removed as it is engaged with a portion of the plate 18. Thus, there is no hazard to the operator whilst cleaning the grill 10.

I claim:

1. An electric grill comprising a lower and an upper grill chassis, each said grill chassis having a bottom wall, sidewalls about said bottom wall and a grill plate made of heat-conductive metal and defining an upper wall; means to removably secure each said grill plate to their respective chassis, an electrically-insulated resistive heating element in each grill chassis intermediate said bottom wall and said grill plate and supported in close proximity to said grill plate, means electrically interconnecting the heating elements of both chassis, electrical terminals in said lower chassis connected to said electrically interconnecting means and adapted to be connected to an electric power source, a sheet of heat-insulating material secured in a substantially horizontal plane and elevated from said bottom wall, a reflector plate secured above said sheet of insulating material, said sheet and reflector plate disposed between said heating element and said bottom wall, said heating element being secured onto said reflector plate, whereby heat will be reflected on said grill plate positioned in close proximity thereof, support means to support each said chassis bottom wall above a common horizontal plane, a hinge connecting said lower and upper chassis along one of their sidewalls to permit said upper chassis to be displaced through a 180° arc from a position where both said grill plates lie side by side in a common horizontal plane to a further position where both said grill plates face each other in substantially juxtaposition, each said grill chassis being of substantially rectangular shape and defining two elongated sidewalls and two end walls, said hinge having a channel member secured to each end wall of said bottom chassis adjacent the end edge of a sidewall and extending above said lower chassis grill plate, an elongated connector member secured to a sidewall of said upper chassis near each end edge thereof and extending above said upper chassis grill plate to define a connecting end, an elongated channel in said channel member extending vertically to the plane of said lower chassis grill plate, and a pin of circular transverse cross-section in said connecting end of said connector member and extending perpendicular thereto and outwardly towards a respective end wall of said upper chassis, each said pin being received within a respective channel to thereby interconnect said upper chassis of said lower chassis and permitting said upper chassis displacement and said upper chassis to be spaced a predetermined distance above said bottom chassis when juxtaposed, and further including a handle member secured to each said lower and upper chassis and located centrally of the side wall remote from the hinge.

2. An electric grill as claimed in claim 1, wherein said channel members, said connector members and said handle members extend below said lower and upper chassis bottom wall to constitute support legs supporting the bottom wall of each said chassis above a common horizontal plane and constituting said support means.

* * * * *